United States Patent [19]

Hamayasu

[11] 4,402,470
[45] Sep. 6, 1983

[54] FISHING REEL

[75] Inventor: Norio Hamayasu, Sakai, Japan

[73] Assignee: Shimano Industrial Company Limited, Osaka, Japan

[21] Appl. No.: 325,913

[22] Filed: Nov. 30, 1981

[30] Foreign Application Priority Data

Dec. 5, 1980 [JP] Japan .............................. 55-172229

[51] Int. Cl.³ .......................................... A01K 89/02
[52] U.S. Cl. .............................. 242/84.52 R; 254/267
[58] Field of Search ............... 242/84.52 R, 84.52 B, 242/84.5 R, 84.51 R, 211–214, 216–221, 75.45, 75.52; 254/267

[56] References Cited

U.S. PATENT DOCUMENTS

| 3,365,833 | 1/1968 | Christiansen | 242/84.1 A |
| 3,801,071 | 4/1974 | Barron | 254/267 |
| 3,849,661 | 11/1974 | Beiter | 242/75.52 |
| 4,037,326 | 7/1977 | Booth et al. | 242/84.1 A |
| 4,114,830 | 9/1978 | Hoshi et al. | 242/75.52 |
| 4,179,084 | 12/1979 | Noda | 242/212 |
| 4,226,387 | 10/1980 | Karlsson | 242/212 |
| 4,278,217 | 7/1981 | Blackwell | 242/217 |

Primary Examiner—Billy S. Taylor
Attorney, Agent, or Firm—Stevens, Davis, Miller & Mosher

[57] ABSTRACT

A fishing reel which supports at its body frame a spool freely rotatably by disengagement of a clutch is provided with a first detector which detects a drawing-out speed of a fishing line wound onto the spool, a second detector which detects a rotational speed of the spool, a processor having an arithmetic unit and connecting with the output lines of the detectors, and an actuator operative by an output signal from the processor which controls application of a rotational resistance against free rotation of the spool.

14 Claims, 8 Drawing Figures ical resistance is applied prior to the occurrence of backlash, thereby preventing the backlash and ensuring that the line does not become loose and twisted or enter into the body frame.

The aforesaid rotational resistance also is applied only when in condition of generating the backlash, whereby the anglar can cast the rig on the line to a desired distance.

Furthermore, the first and second detectors output signals for electrically actuating the actuator, thereby automatically controlling the rotational resistance. Hence, the anglar may cast without worrying about the occurrence of backlash and even those unfamiliar with the use of the reel can handle it with ease.

These and other objects of the invention will be seen by reference to the description, taken in connection with the accompanying drawings, in which:

BRIEF DESCRIPTION OF THE INVENTION

FIG. 1 is a longitudinal sectional view of an embodiment of a fishing reel of the invention, FIG. 2 is a right side view of the fishing reel in FIG. 1, from which a cover is removed, FIG. 3 is a sectional view taken on the line III—III in FIG. 2, FIG. 4 is a perspective view of a spool only, FIG. 5 is a block diagram of electrical control in the reel, FIG. 6 is a sectional side view of a modified embodiment of the invention, FIG. 7 illustrates a typical magnetic detector which can be used in the invention, and FIG. 8 illustrates a modification of the FIG. 4 structure.

DETAILED DESCRIPTION OF THE INVENTION

Figure 1:
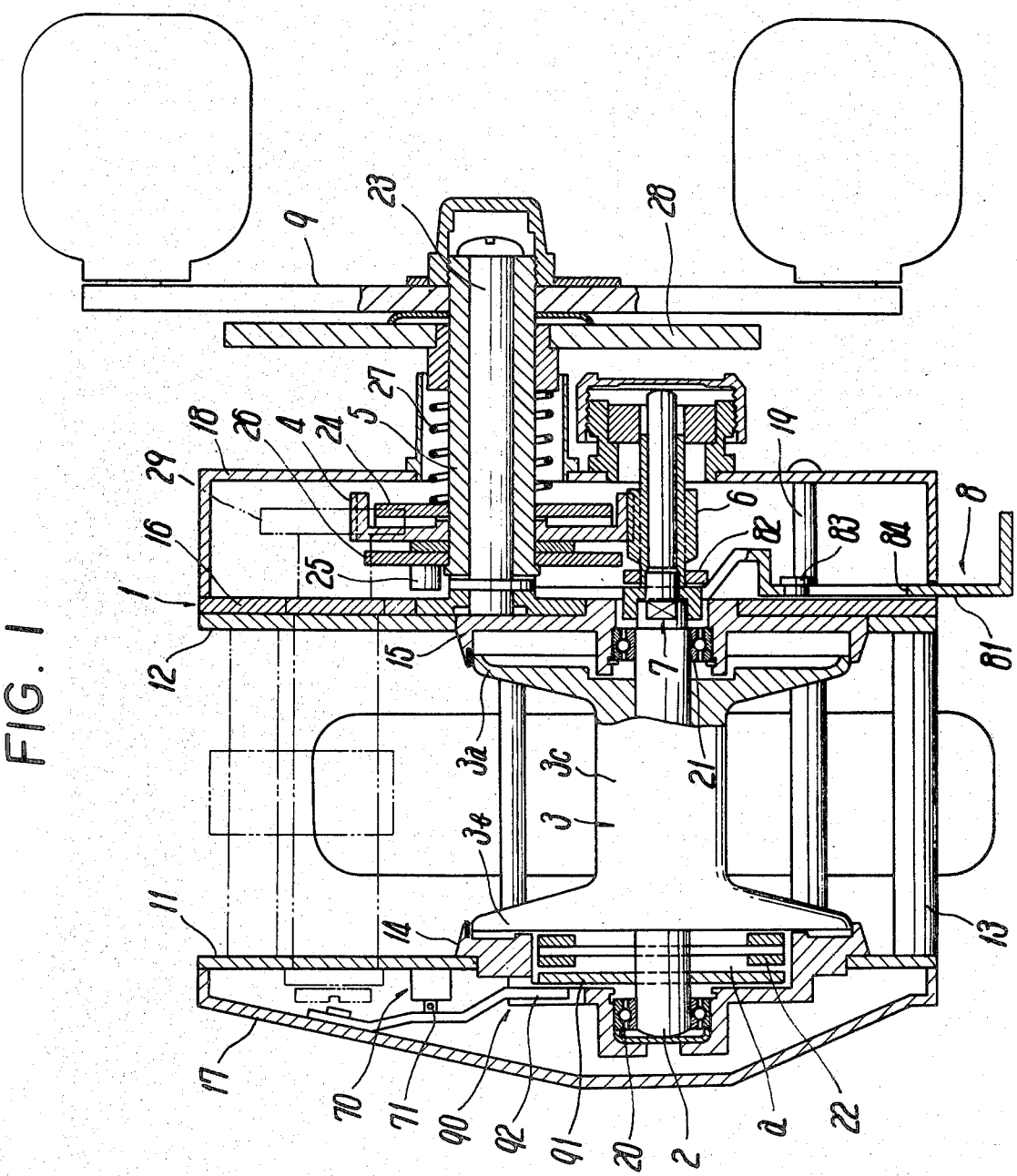

Referring to FIG. 1, a fishing reel has a spool shaft 2 fixedly carrying a spool 3 and journalled to a body frame 1, a handle shaft 5 carrying a master gear 4 is supported to the body frame 1, a pinion 6 in mesh with the master gear 4 is supported axially slidably to the spool shaft 2, and a clutch 7 is provided between the pinion 6 and the spool shaft 2 and is engaged or disengaged by a clutch operating mechanism 8, the clutch 7 engaging to transmit a rotating force from the handle shaft 5 of handle 9 to the spool shaft 2 through the master gear 4, pinion 6 and clutch 7, and disengaging to permit the spool 3 to freely rotate. In the above construction, the handle shaft 5 and handle 9 constitute a drive mechanism, and the master gear 4 and pinion 6 constitute a transmission mechanism, the clutch 7 being included therein.

The body frame 1 in FIG. 1 is provided with a left side frame 11, a right side frame 12 and a plurality of connecting rods 13 for connecting the frames 11 and 12, bearing housings 14 and 15 are incorporated with both the side frames 11 and 12, a side plate 16 is attached to the outside of right side frame 12, and covers 17 and 18 are attached on the outsides of side plate 16 and left side frame 11 by use of fixing means, such as a plurality of bolts 19 respectively.

The bearing housings 14 and 15 have at the outer peripheries thereof annular protrusions slightly larger in diameter than flanges 3a and 3b at the spool 3, and, at

FISHING REEL

FIELD OF THE INVENTION

This invention relates to a fishing reel, and more particularly to a fishing reel which has a spool having a spool shaft and journalled to a body frame, which spool is made rotatable by disengagement of a clutch.

BACKGROUND OF THE INVENTION

Generallly, this kind of fishing reel has a drive mechanism and a transmission mechanism which transmits a driving force from the drive mechanism to the spool shaft. The drive mechanism rotates the spool shaft and spool (to be hereinafter merely called the spool) to wind up a fishing line thereon. A clutch in the drive mechanism disengages to make the spool freely rotatable allowing the line to be drawn out of the spool for casting.

In such reel, when a fishing rig at an end of the line is cast, a drawing speed of the line from the spool becomes smaller than a rotational speed of the spool which leads to the occurrence of backlash, thus creating a problem in that the line gets loose and twisted, or enters into the body frame.

Conventionally, in order to solve the above problem, a centrifugal brake or a drag mechanism is used to give a rotational resistance to the spool shaft, which merely exerts braking action on the spool shaft, but cannot basically prevent backlash. Also, such braking device, even when no backlash occurs, is apt to act on the spool and affects a casting distance.

An angler may press his thumb onto the outer periphery of the spool to apply thereto a braking effect to prevent backlash, but this requires much technique and is not performable by those unfamiliar with the use of such a conventional reel.

SUMMARY OF THE INVENTION

In the light of the above problem, this invention has been designed. An object of the invention is to provide a fishing reel which can apply to the spool a resistance against its rotation only when backlash is about to occur, thereby preventing the fishing line from twisting or entering into the body frame of the reel, thus enabling the angler to cast the rig to a desired distance.

This inventor has paid attention to the fact that backlash is caused by a difference between the rotational speed of spool and the line-drawing-out speed, so that this invention is so designed that the spool rotational speed and line-drawing-out speed are detected and their detection signals are compared, and then the spool is given a resistance against its free rotation prior to the occurrence of backlash. This invention is characterized in that the reel is provided with a first detector which detects the line-drawing-out speed, a second detector which detects the rotational speed of spool, a processor connecting with the output lines of the detectors, and an actuator electrically operative by an output signal from the processor, thereby controlling a rootational resistance against free rotation of the spool.

In this invention, a braking device mainly is used to control the aforesaid rotational resistance and is actuated by the actuator to apply the rotational resistance to the spool. Or, a clutch operating mechanism at the conventional transmission mechanism is utilized in such a manner that the actuator operates to engage the clutch, and the transmission and drive mechanisms are connected to be used for applying the rotational resisthe center, bosses which have ball bearings 20 and 21 and support the spool shaft 2 therethrough respectively.

One bearing housing 14 at the left side frame 11 is dish-like shaped and has a hollow a inside the flange of bearing houses 14. In addition, the hollow a housing therein a centrifugal brake 22 as shown in FIG. 1, which is not indispensable.

The side plate 16 at the right side frame 12 secures a support shaft 23 on which the handle shaft 5 is rotatably sleeved. On the handle shaft 5 are sleeved the master gear 4, a friction plate 24, and an anti-reverse-rotation plate 26 having a plurality of projections 25.

The friction plate 24 and anti-reverse-rotation plate 26 are fitted onto the handle shaft 5 rotatably together therewith. The master gear 4 is sleeved freely onto the handle shaft 5 so that a rotating force is transmitted therefrom to the gear 4 through the friction plate 24 which is biased by a spring 27 to press-contact with the master gear 4, the spring 27 being adjustable of its biasing force by an adjuster 28 screwed with one axial end of handle shaft 5.

The clutch 7 comprises flat faces provided at an intermediate portion of spool shaft 2 and a tubular portion provided at the pinion 6 and having a not-round inner surface engageable with the flat faces. The operating mechanism 8 is operated to disengage the tubular portion from the flat faces of spool shaft 2, thereby keeping the spool 3 freely rotatable.

Figure 2:
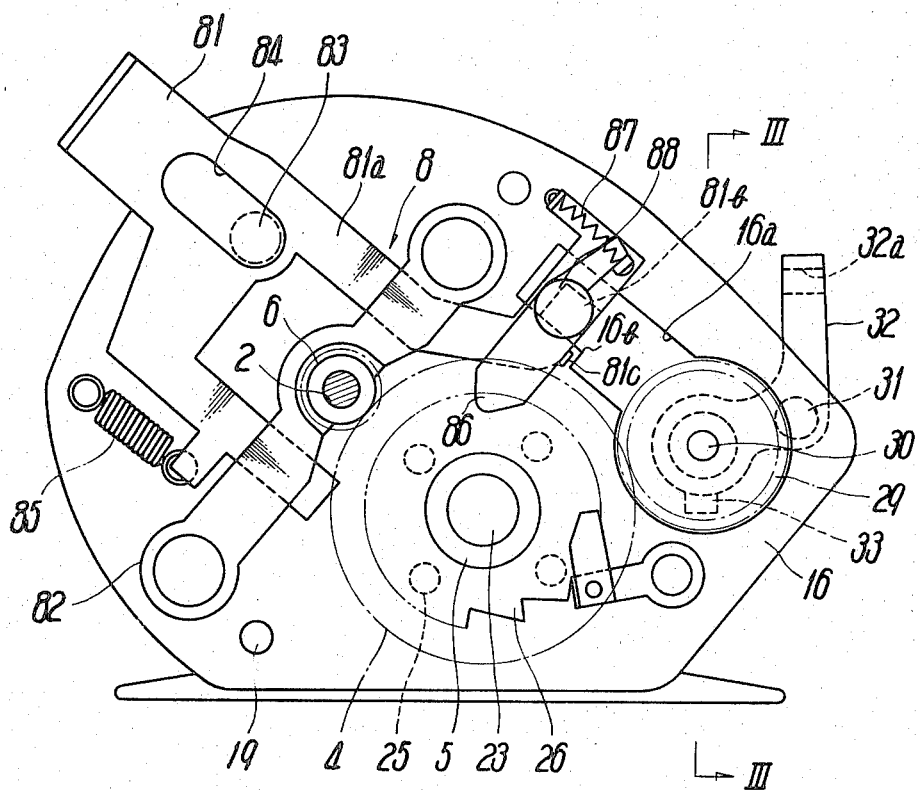

Also, the clutch operating mechanism 8, as shown in FIG. 2, comprises a fork-shaped clutch lever 81 and a clutch yoke 82 holding the pinion 6. The clutch lever 81 is supported to the side plate 16, and is freely reciprocative in the direction perpendicular to the spool shaft 2 through an elongate slot 84 and a pin 83 fixed to the side plate 16, is and swingable around the pin 83. A return spring 85 biases the clutch lever 81 backwardly.

An engaging portion 81b is provided at the foremost end of one leg 81a of the forked end of clutch lever 81, and a stepped portion 16b is formed at a cutout 16a formed at the side plate 16, so that the engaging portion 81b engages with the stepped portion 16b when the clutch lever 81 reaches its forward movement end position, thus holding the lever 81 thereat.

A contact 86 is pivoted to the foremost end of leg 81a through a pin 88 and serves to contact with one projection 25 at the anti-reverse-rotation plate 26 to allow the clutch lever 81 to return through the spring 85, and normally engages with a stopper 81c at the utmost end of leg 81a through a spring 87 provided between the leg 81a and the contact 86.

The contact 86 is not indispensable, but advantageous, when in use, in that the clutch lever 81 can move forwardly wherever each projection 25 is positioned, because the contact 86, even when hit by one projection 25 during the forward movement of clutch lever 81, swings to escape from the projection 25. In addition, the contact 86 is not restricted to the construction in FIG. 2 as other constructions can be used.

Figure 3:
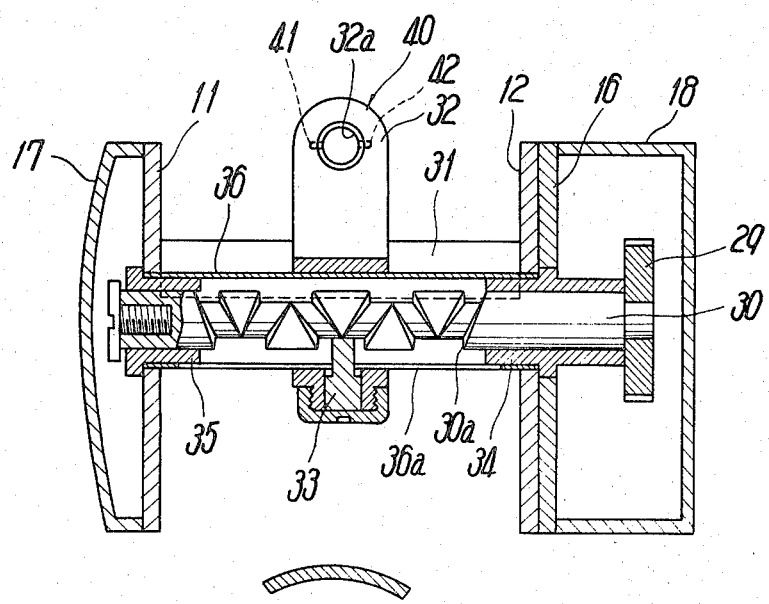

A traverse shaft 30, as shown in FIG. 3, is journalled to the side plates 11 and 12 through a pair of bearings 34 and 35, which carries at one axial end a pinion 29 in mesh with the master gear 4 and has traverse grooves 30a at an intermediate portion. A guide shaft 31 parallel to the traverse shaft 30 is fixed between the side frames 11 and 12 and carries a guide 32, which is axially movable and has a guide bore 32a for guiding the line to the spool 3 and a projection 33 to be fitted into the traverse grooves 30a, so that the handle 9 is turned to rotate the traverse shaft 30 by way of master gear 4 and pinion 29 and reciprocate the guide 32 along the guide shaft 31 through the projection 33.

In addition, in FIG. 3, reference numeral 36 designates a sleeve which is fixed to the bearings 34 and 35, covers the traverse shaft 30, and has at the lower surface an elongate slot 36a through which the projection 33 moves axially of the shaft 30.

Figure 5:
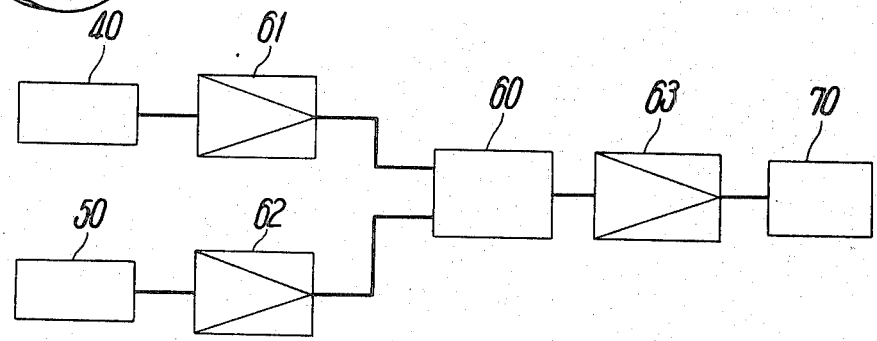

The reel of the invention constructed as foregoing is provided with a first detector 40 which detects the line drawing speed out of the spool 3 and a second detector 50 which detects the rotational speed of spool 3, the detectors 40 and 50 connecting at output lines thereof with a processor 60 having an arithmetic logical unit as shown in FIG. 5, and an actuator 70 mainly comprising a solenoid is provided, which operates by an output signal from the processor 70 and controls a rotational resistance against the free rotation of spool 3. In addition, in FIG. 5, reference numerals 61, 62, and 63 designate amplifiers.

The first detector 40, as shown in FIG. 3, uses, for example, a luminous element 41, such as a light-emitting diode, and a photosensitive element 42, such as a phototransistor, which are mounted diametrically opposite to each other on the inner periphery of guide bore 32a at the guide 32. On the other hand, the fishing line is provided with colored portions at intervals each of a given length.

The line, when drawn out of the spool 3 through the guide bore 32a for casting, intercepts at its colored portions the light from the light-emitting diode 41 to the phototransister 42, so that the first detector 40 outputs pulse signals, thereby detecting the line-drawing-out speed.

Figure 7:
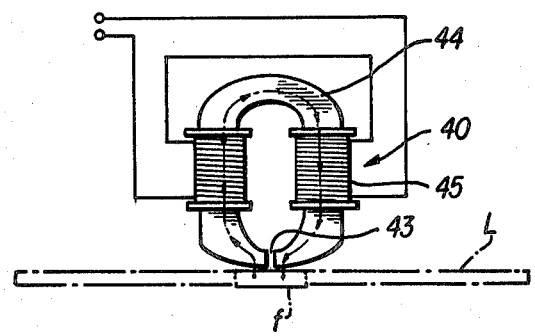

Alternatively, the detector 40 may comprises a light source and a phototube, or use a magnetic detection means (FIG. 7). In the latter case, the line L is attached or coated with a magnetic substance f at regular intervals. While, an electromagnetic transducer of a coil 45 and an irons core 44, is provided at the guide bore 32a or an insertion portion provided between the spool 3 and the guide 32, thereby outputting magnetic pulse signals.

Figure 4:
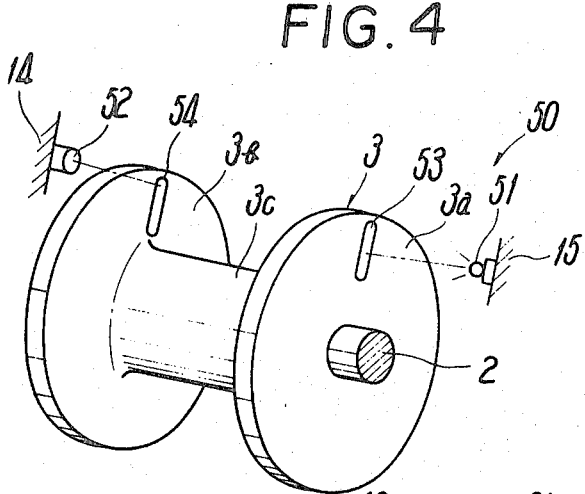

The second detector 50, as shown in FIG. 4, uses a luminous element 51, such as a light-emitting diode, and a photosensitive element 52, such as a phototransistor or a phototube, which are mounted on the bearing housings 15 and 14 respectively. At the flanges 3a and 3b of spool 3 are provided elongate slots 53 and 54 extending radially of the spool 3 from a trunk 3c thereof to the outer peripheries of flanges 3a and 3b.

The photosensitive element 52 outputs one pulse signal per one rotation of spool 3 to thereby measure the number of rotations thereof. The slots 53 and 54 each have an enlarged area through which the light passes, because a diameter of a lump of wound line on the spool 3 decreases as the line is drawn out. As a result, the intensity of the light sensed by the photosensitive element 52 increases and the output signal therefrom becomes larger in pulse height, thereby making it possible to measure sequentially changing diameters of a lump of wound line on the spool 3. Hence, information of the number of rotations is obtained from the above measurement thereof, and that of the changing diameters from the measurement thereof, whereby these informations can detect a rotational speed of spool 3 through the line positioned outermost of the lump of wound line.

In addition, the second detector 50 may merely detect the rotational speed of spool 3 itself, but it is preferable to detect that of the line outermost of the lump of wound line on the spool's trunk 3c, thereby performing a more accurate detection of the occurrence of backlash.

Figure 8:
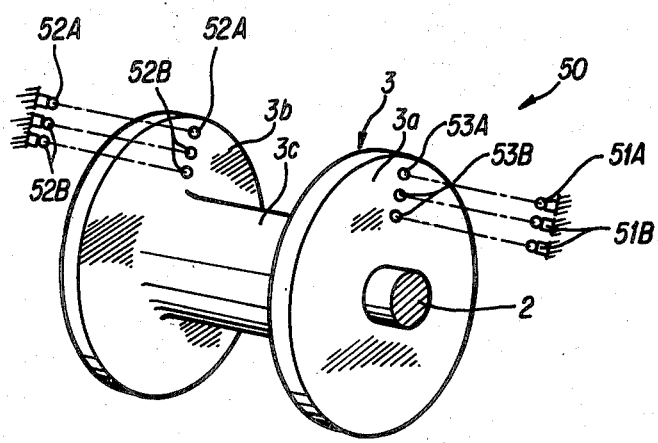

Alternatively, the second detector 50 may be provided at the flanges 3a and 3b of spool 3 with a plurality of through bores (FIG. 8) 53A, 53B, 54A, 54B each combined with the luminous element 51A, 51B or photosensitive element 52A, 52B, the through bores being arranged in alignment with each other radially outwardly from the trunk 3c. In this case, the through bores positioned radially outermost of the flanges 3a and 3b and the luminous element 51A and photosensitive element 52A corresponding to the outermost bores, are used to measure the number of rotations of spool 3. While, other through-bores 53B, 54B and corresponding luminous elements 51B and photosensitive elements 52B can measure diameters of the changing lump of wound line.

The processor 60 is given output signals from the detectors 40 and 50 and compares the line-drawing-out speed with the rotational speed of spool 3 to thereby detect the occurrence of backlash, and connects at the output line with the actuator 70 which is adapted to actuate, for example, a braking device 90 incorporated in the body frame 1 as shown in FIG. 1.

In detail, the braking device 90 comprises a brake disc 91 which is disposed in the hollow a at the bearing housing 14 and fixed to the spool shaft 2 and a brake shoe 92 of a leaf spring which is mounted on the cover 17 at the left side frame 11, and connects on the way with a movable iron core 71 of a solenoid used as the actuator 70.

The actuator 70 is fixed to the left side frame 11 and mainly uses a dry battery (not shown) as a power source, which actuator 70 may be housed in the body frame 1, but is preferably placed in a separate box and connected with an electric circuit of the light-emitting diode 41 or the like through wires.

In the reel constructed as abovementioned, the clutch lever 81 is moved forwardly to disengage the clutch 7 and make the spool 3 freely rotatable, thereby permitting casting of the line. If the rotational speed of spool 3 is larger than the line-drawing-out speed during the casting and a backlash is about to occur, the processor 60 determines this from detection signals from the first and second detectors 40 and 50, and outputs signals to excite the actuator 70, thereby actuating the braking device 90. In other words, in the aforesaid embodiment, when the actuator 70 is energized to move its movable iron core 71 rightwardly in FIG. 1, the brake shoe 92 connected to the core 71 swings counterclockwise to press-contact at the utmost end thereof with the brake disc 91, and applies a rotational resistance to the spool 3.

Therefore, the rotational resistance exerts the braking action on the spool 3, so that the spool 3 rotates at low speed or stops, thereby preventing the occurrence of backlash.

After the casting, an anglar moves the clutch lever 81 backwardly to engage the clutch 7 and waits a bite of a fish. When a fish is hooked, he turns the handle 9 to wind the line onto the spool 3 for fishing.

In addition, the backward movement of clutch lever 81, as well-known, is automatic by rotation of handle shaft 5.

In detail, the handle shaft 5 rotates to allow each projection 25 at the anti-reverse-rotation plate 26 to revolve, so that the contact 86 contacts with one projection 25 and allows the clutch lever 81 to swing around the pin 83 keeping the clutch lever 81 in contact with the stopper 81c. Hence the engaging portion 81b disengages from the stepped portion 16b and the return spring 85 restores the clutch lever 81.

Alternatively, the spool 3 may be given the rotational resistance in such a manner that the clutch lever 81 is moved backwardly to engage the clutch 7 to thereby allow the transmission mechanism and drive mechanism to follow the free rotation of spool 3 and apply the resistance.

Figure 6:
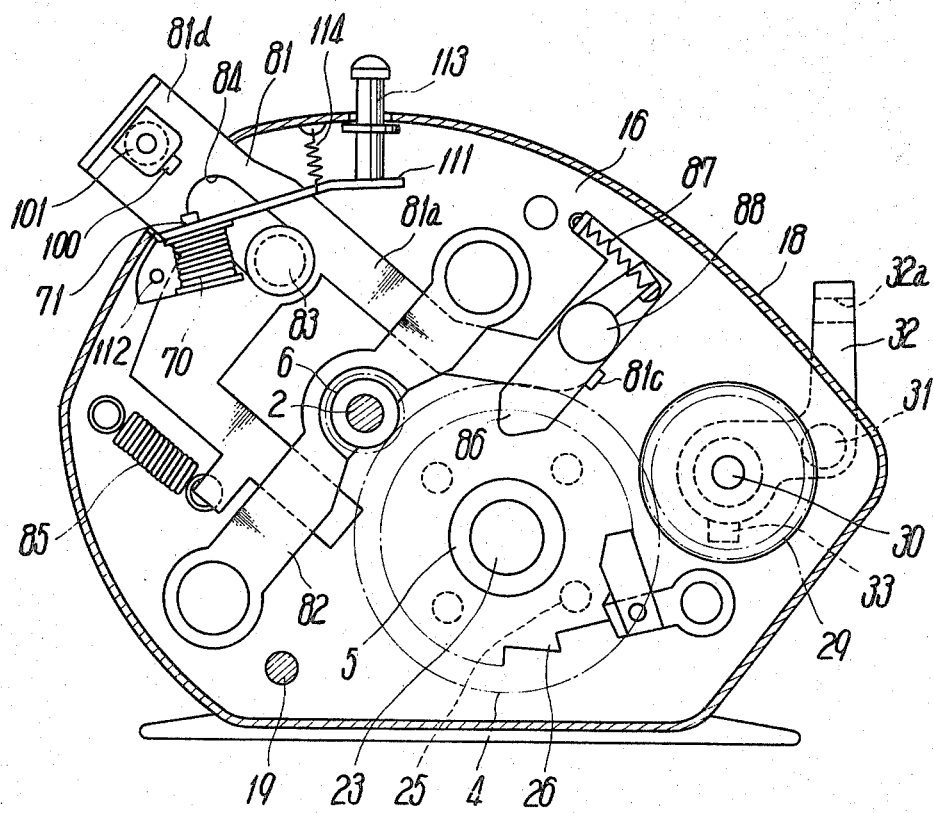

In this instance, the clutch lever 81, as shown in FIG. 6, carries at its control portion 81d a permanent magnet 100 swingable through a holder 101, and a bracket member 111 is pivoted to the cover 18 through a pin 112 and carries the actuator 70 or solenoid, so that the permanent magnet 100, at the position where the forward movement of clutch lever 81 ends, attracts the iron core 71 at the solenoid 70 to hold the clutch 7 in disengagement. On the other hand, for applying the rotational resistance to the spool 3, the solenoid 70 is energized to generate a magnetic field, so that the permanent magnet 100 repels the core 71 to return the clutch lever 81 by the spring 85, thereby engaging the clutch 7.

In the above construction, the end of permanent magnet 100 opposite to the solenoid 70 and the end of iron core 71 which attracts the magnet 100, are made homopolar.

Referring to FIG. 6, the bracket member 111 has at its free end an operating push 113 and a spring 114 is interposed between the cover 18 and the bracket member 111, so that the operating push 113 also is operable to disengage the clutch lever 81 from the permanent magnet 100 at the end of forward movement of clutch lever 81.

Alternatively, the braking device 90 may use the flange 3b of spool 3 as the brake drum 91, or the spool shaft 2 may substitute for the brake drum 91 and contact with the brake shoe 92. Also, the brake shoe 92 of the leaf spring may be substituted by an electromagnetic brake means.

As seen from the above, the reel of the invention is adapted to give the spool 3 a resistance against its free rotation when backlash is about to occur during casting, thereby preventing the occurrence of backlash and ensuring that the line does not get loose and twisted or enter into the body frame 1.

The rotational resistance is not always provided to the spool 3, but only when the backlash loosens the line, so that no casting distance is affected and the so-called thumbing is most desirably performable.

Furthermore, the rotational resistance is automatically applied to the spool, whereby an angler is free from the care of the occurrence of backlash and those even unfamiliar with the use of the reel can handle it with ease.

Although several embodiments have been described, they are merely exemplary of the invention and not to be constructed as limiting, the invention being defined solely by the appended claims.

What is claimed is:

1. A fishing reel comprising:
   a body frame,
   a spool journalled to said frame and having a spool shaft, a drive mechanism for driving said spool shaft, a transmission mechanism including a clutch, for transmitting a driving force from said drive mechanism to said spool shaft, said transmission mechanism upon operation of said drive mechanism, rotating said spool shaft and spool to wind a fishing line onto said spool, said clutch disengaging to make said spool shaft and spool freely rotatable, so that a fishing line may be drawn out of said spool by casting, a first detector for detecting a drawing-out speed of said fishing line on said spool and providing a first signal corresponding thereto, a second detector for detecting a rotational speed of said spool and providing a second signal corresponding thereto, a processor having an arithmetic unit and connected to receive said first and second signals, said processor comparing said first and second signals and providing an actuator control signal which changes in accordance with changes in said first and second signals, means for applying a rotational resistance against the free rotation of said spool shaft and spool, and an actuator responsive to the actuator control signal from said processor, said actuator operating according to said control signal when a spool rotational speed exceeds a line drawing-out speed to cause said applying means to apply a rotational resistance against the free rotation of said spool shaft and spool.

2. A fishing reel according to claim 1, wherein said means for applying a resistance is a braking device included in said reel which applies a resistance to said spool against the free rotation thereof, said actuator being connected with said braking device.

3. A fishing reel according to claim 2, wherein said braking device includes a brake disc and a brake shoe opposite thereto, said actuator being connected with said brake shoe.

4. A fishing reel according to claim 3, wherein said actuator, which actuates said braking device, comprises a solenoid having a movable iron core which connects with said brake shoe at said braking device.

5. A fishing reel according to claim 1, wherein said body frame includes an operating mechanism for disengaging said clutch, and said means for applying a resistance comprises said operating mechanism which is actuated by operation of said actuator to engage said clutch, thereby applying resistance against free rotation of said spool shaft and spool.

6. A fishing reel according to claim 5, wherein said operating mechanism is provided with a clutch lever having a permanent magnet and being supported to said body frame in relation of being freely reciprocative, a clutch yoke which moves axially of said spool shaft in association with reciprocation of said clutch lever and disengages said clutch at a position where said clutch lever ends its forward movement, and a spring biasing said clutch lever toward a position where said clutch lever ends its backward movement, said actuator comprising a solenoid and being disposed at the position where said clutch lever ends its forward movement, so that said permanent magnet attracts said solenoid to hold said clutch lever at its forward movement end position, said solenoid is energized to generate a magnetic field to thereby allow said permanent magnet to repel said solenoid, and said spring restores said clutch lever to its backward movement end position, thereby engaging said clutch to apply resistances against free rotation of said spool shaft and spool.

7. A fishing reel according to claim 1 wherein said fishing line has detectable areas provided at intervals therealong and said first detector detects said detectable areas to provide said first signal.

8. A fishing reel according to claim 7 wherein said intervals are regularly spaced intervals.

9. A fishing reel according to claim 7, wherein a guide is included in sid reel, said guide having a guide bore for guiding a fishing line to be wound onto said spool, said guide incorporating said first detector.

10. A fishing reel according to claim 9, wherein said first detector comprises a luminous element and a photosensitive element, which are mounted on the inner periphery of said guide bore and opposite to each other, and said fishing line has colored portions at regular intervals.

11. A fishing reel according to claim 7, wherein said first detector comprises an electromagnetic transducer which outputs a magnetic pulse signal, said fishing line wound onto said spool having magnetic material attached thereto at regular intervals.

12. A fishing reel according to claim 7, wherein said spool is provided with a trunk and a pair of flanges, said second detector comprising a luminous element and a photosensitive element, said luminous element and photosensitive element being supported to said body frame which is opposite to said flanges respectively, each of said flanges having a through bore at the same position circumferential and radial of said flange.

13. A fishing reel according to claim 12, wherein said through bore comprises an elongate slot extending radially from said trunk to the vicinity of each of said flanges.

14. A fishing reel according to claim 12, wherein a plurality of said through bores are provided at each of said flanges and disposed in alignment with each other radially from said trunk to the outer peripheral edge of each of said flanges, and a plurality of luminous elements and photosensitive elements are provided opposite to said through bores respectively.

* * * * *